July 27, 1965
C. K. NELSON ET AL
3,196,809
EXTRUSION NOZZLE
Filed May 4, 1962
4 Sheets-Sheet 3
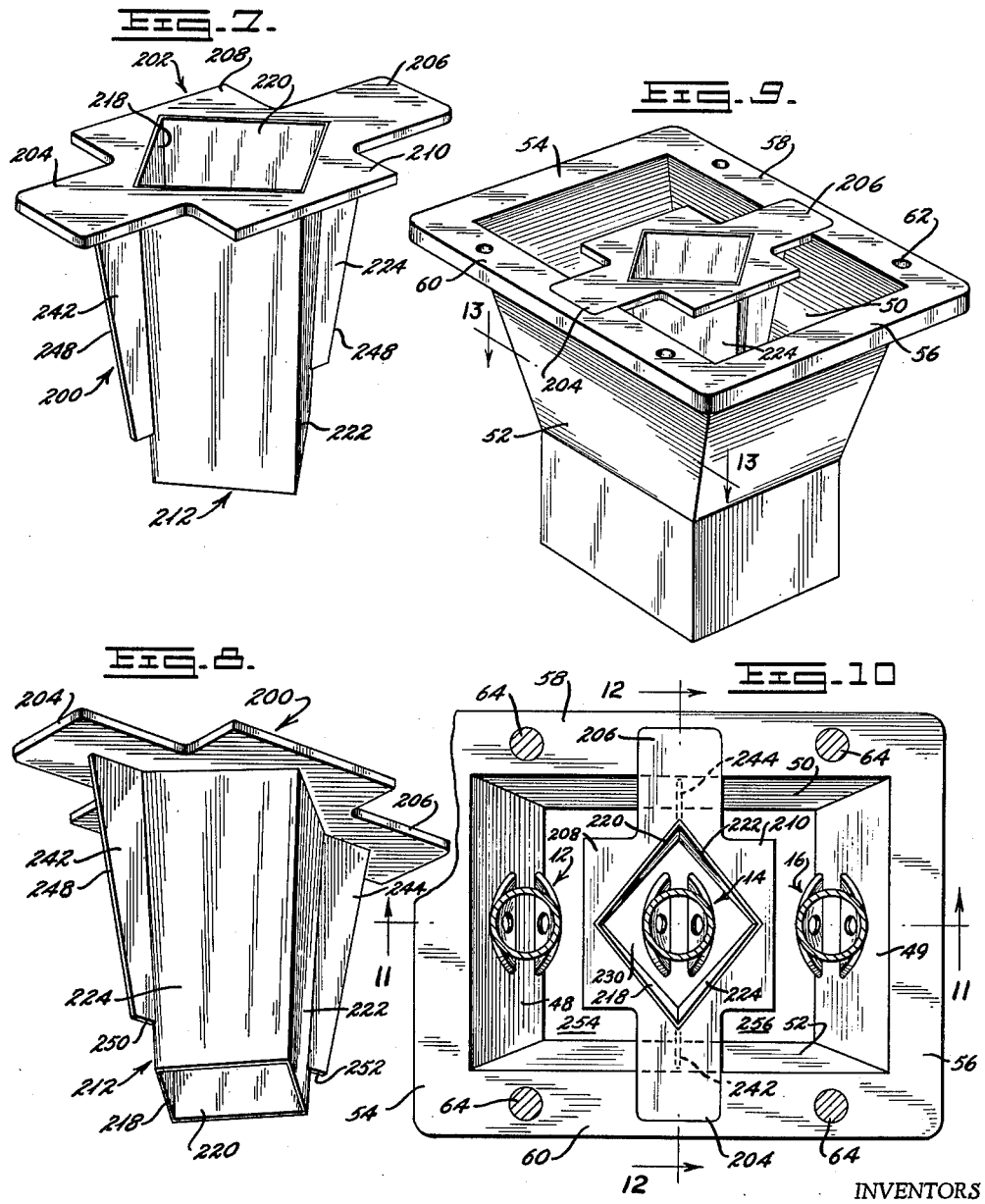
INVENTORS
CHRISTIAN K. NELSON
CHARLES W. MELTON
THOMAS L. JERNIGAN
by their attorney
Robert B. Buckley July 27, 1965
C. K. NELSON ET AL
3,196,809
EXTRUSION NOZZLE
Filed May 4, 1962
4 Sheets-Sheet 4
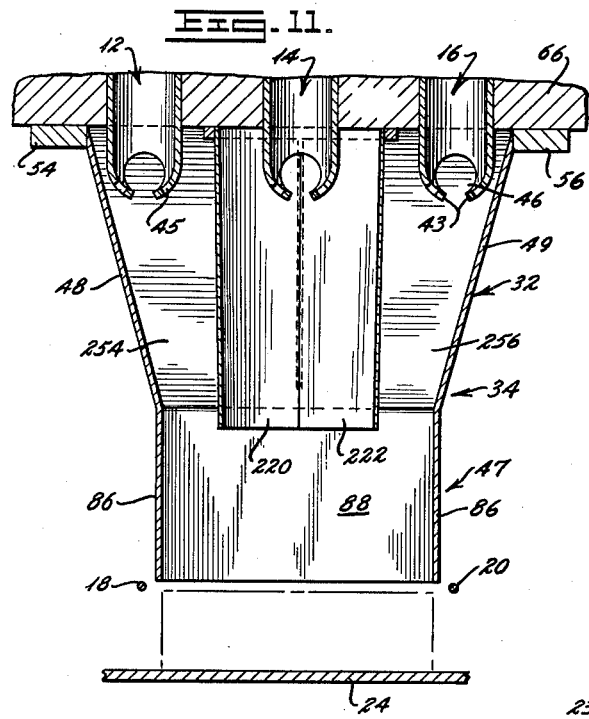
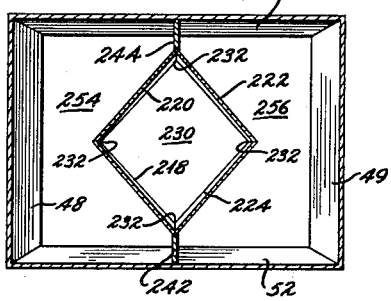
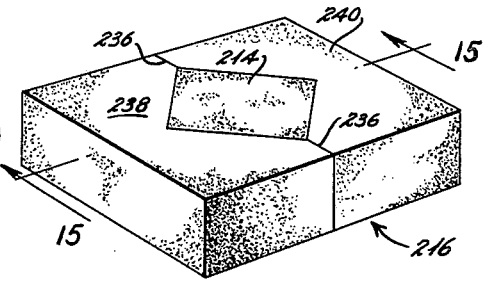
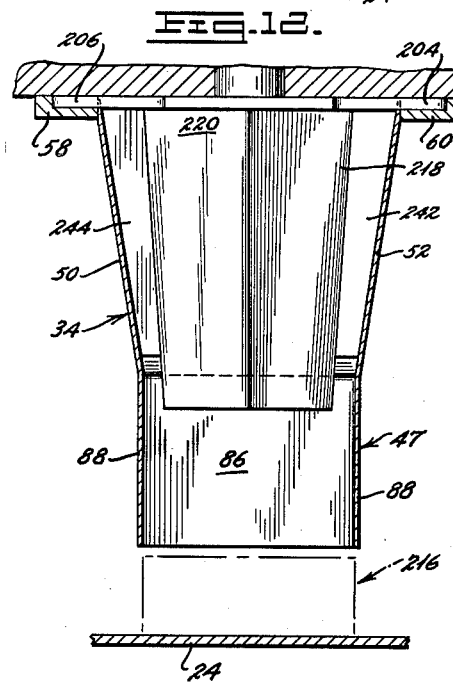
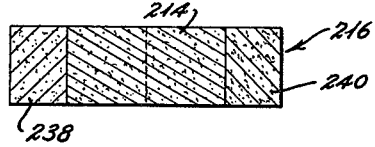
INVENTORS
CHRISTIAN K. NELSON
CHARLES W. MELTON
THOMAS L. JERNIGAN
by their attorney
Robert B. Buckley United States Patent Office 3,196,809
Patented July 27, 1965

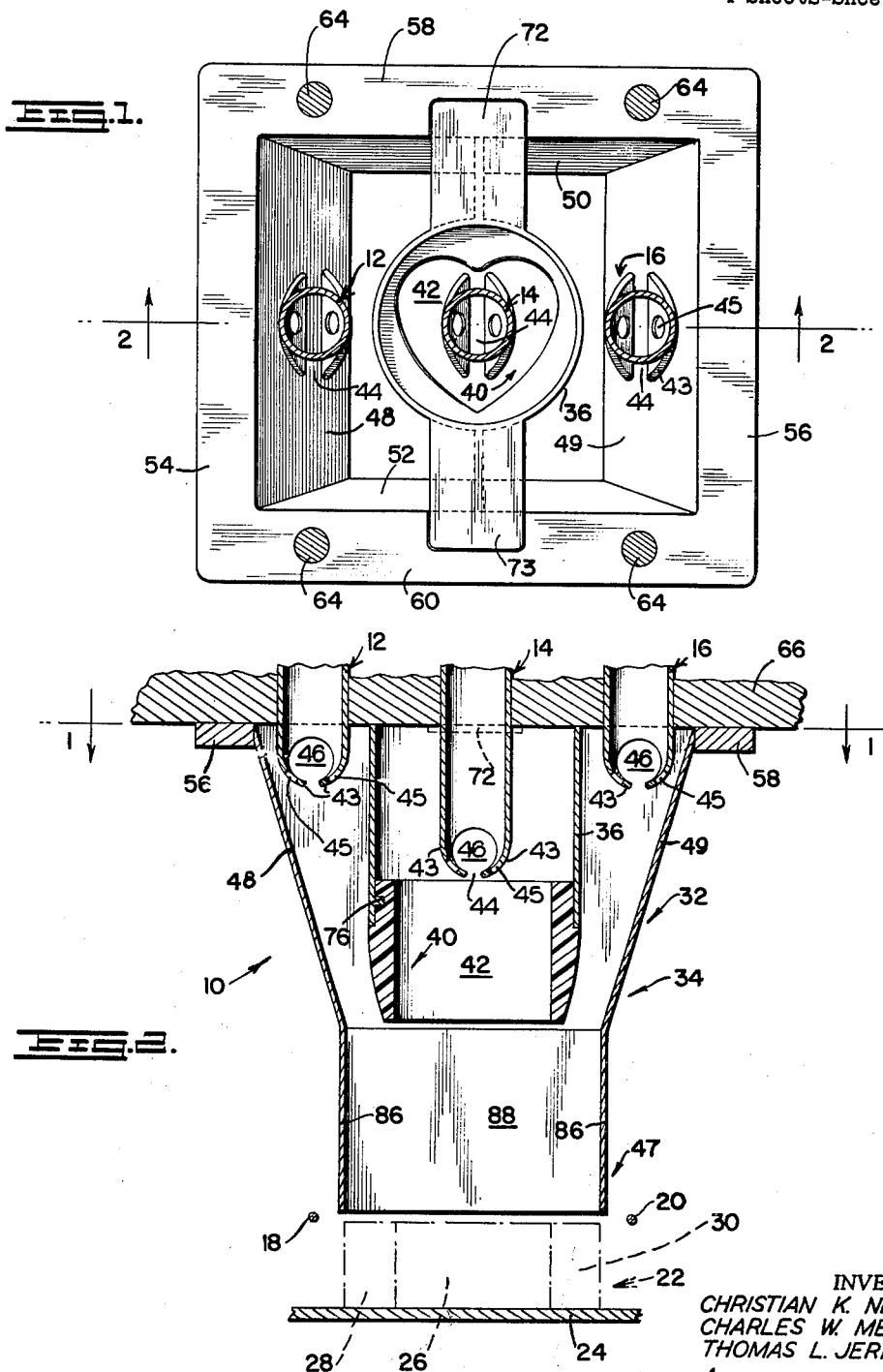
July 27, 1965 C. K. NELSON ET AL 3,196,809
EXTRUSION NOZZLE
Filed May 4, 1962 4 Sheets-Sheet 1
INVENTORS.
CHRISTIAN K. NELSON
CHARLES W. MELTON
THOMAS L. JERNIGAN
by their attorney
Robert B. Buckley

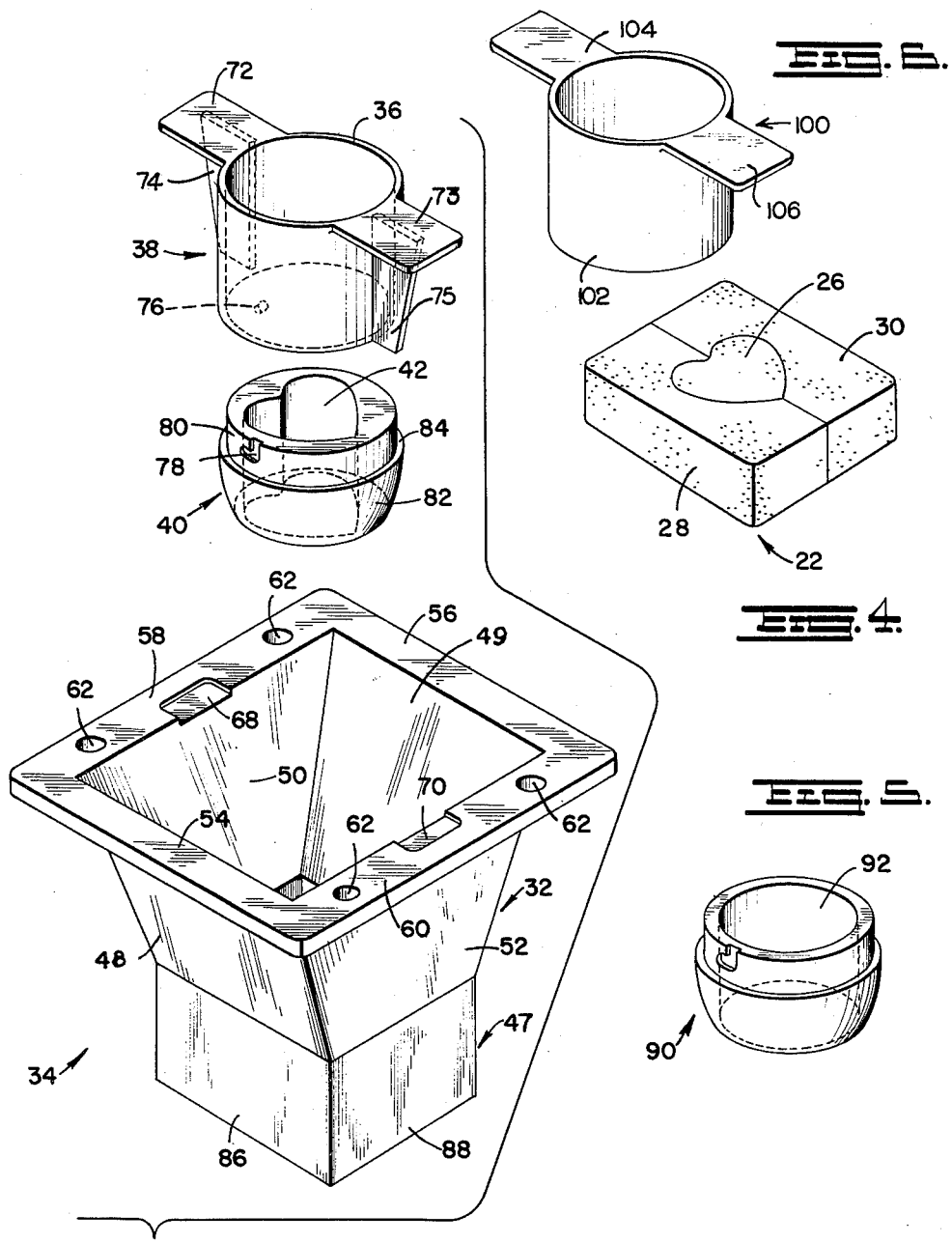

3,196,809
EXTRUSION NOZZLE
Christian K. Nelson, Los Angeles, Calif., and Charles W. Melton and Thomas L. Jernigan, Henrico County, Va., assignors to Eskimo Pie Corporation, Richmond, Va., a corporation of Delaware
Filed May 4, 1962, Ser. No. 192,505
17 Claims. (Cl. 107—1)

This is a continuation-in-part of application Serial No. 842,940, filed September 28, 1959 and now abandoned.

The present invention relates to the extrusion of frozen desserts, such as ice cream, ice milk, and sherbets. More particularly, the present invention relates to the extrusion of composite multi-flavored bars of frozen dessert.

The present invention resides in the concept of a nozzle for extruding composite bars of frozen dessert having a core of a desired flavor and shape surrounded by frozen dessert of one or more other flavors. Among the frozen desserts which can be extruded are ice cream, ice milk and sherbets.

The nozzle of the invention reproducibly produces a series of frozen dessert bars of uniform shape that are free of voids and have flat sides and desired shapes.

The nozzle of the invention is designed to reduce costs of production and provide readily interchangeable parts so that the shape of the core of a composite ice cream bar can be conveniently changed as desired.

Machinery for handling edibles must meet standards of cleanliness set down by health boards and health commissions of states and local municipalities. A further advantage of the nozzle of the invention is that it is constructed so that it can be disassembled to expose the surfaces for cleaning, thus avoiding the collection of food particles with resultant unsanitary conditions.

Apparatus having internal welds frequently has pits and cracks in the welds which collect dirt and are likely to cause the health board or commission to disapprove of machinery containing such internal welds. An advantage of the nozzle of the invention is that it is constructed without internal welds and has smooth, clean internal surfaces.

For a better understanding of the invention and its other objects, advantages and details, reference is now made to the presently preferred embodiments of the invention which are shown, for purposes of illustration only, in the accompanying drawings.

In the drawings:

FIGURE 1 is a horizontal section through frozen dessert extrusion apparatus including an extrusion nozzle according to the invention and taken along the line 1—1 in FIGURE 2;

FIGURE 2 is a vertical section taken along the line 2—2 in FIGURE 1;

FIGURE 3 is an exploded view of the elements of the nozzle illustrated in FIGURES 1 and 2;

FIGURE 4 is a perspective of a composite ice cream bar produced by the apparatus shown in FIGURES 1 to 3;

FIGURE 5 is a perspective of another form of die that can be employed with the nozzle illustrated in FIGURES 1 to 4;

FIGURE 6 is a perspective view of another form of adapter according to the invention;

FIGURE 7 is a perspective view, from above, of another form of die member according to the invention;

FIGURE 8 is a perspective view, from below, of the integral die member shown in FIGURE 7;

FIGURE 9 is a perspective view, from above, of an extrusion nozzle including the integral die member shown in FIGURES 7 and 8;

FIGURE 10 is a plan view, from the top, of the extrusion nozzle shown in FIGURE 9 and showing the delivery pipes in section;

FIGURE 11 is a vertical section on the line 11—11 in FIGURE 10;

FIGURE 12 is a vertical section on the line 12—12 in FIGURE 10;

FIGURE 13 is an intermediate horizontal section on the line 13—13 in FIGURE 9;

FIGURE 14 is a perspective view of a multi-flavored ice cream bar, with diamond-shape center, produced with the extrusion nozzle shown in FIGURES 7–13; and, FIGURE 15 is a vertical section on the line 15—15 in FIGURE 14.

Briefly stated, the extrusion nozzle of the invention includes an outer housing or tube. An inner tube or die member is mounted inside the outer housing and spaced from the housing. The inner die member receives frozen dessert, or other fluid material, to form a core in the composite extrusion. Material, or materials, to form enveloping material around the core is supplied to the space between the outer housing and the inner die member.

The housing is tapered to compact the frozen dessert, forcing the dessert into the corners and against the walls of the housing, and around the core material. Thereby, frozen dessert bars of uniform shape are produced without voids and having flat sides and desired shapes.

The die member can have a taper, so as to compact the frozen dessert passing therethrough, and form a core without voids and having uniform shape.

As the continuous extrusion emerges from the outlet end of the housing, it is cut into bars by reciprocating wires.

The tapered portion of the housing includes a larger infeed end and a smaller inner cross-section distant from the infeed end. The outlet end of the housing is provided by an outlet housing portion joined to the smaller end of the tapered housing portion. The outlet housing portion has a substantially uniform inner cross-section along its length for forming a composite extrusion with flat sides. When the outer envelope, or secondary frozen dessert, material is supplied to the bore of the housing at its infeed end and it flows through the bore, the cross-section which it occupies decreases, because of the taper of the housing, and the material is compacted and forced into the corners of the housing and uniformly against the inner surfaces of the housing. Thereby, the envelope material is forced against the walls of the outlet housing portion and firmly around the primary core frozen dessert material to form a composite extrusion with flat sides and corners filled out.

In the embodiment of the invention shown in FIGURES 1–6, the die member includes an adapter releasably mounted on the housing and a die releasably connected to the lower portion of the adapter. In this form of the invention, the die can be formed of readily machinable materials, such as synthetic resin plastic, while the adapter can be formed of stainless steel. A plurality of dies can be employed, with differently-shaped apertures therein, in connection with the adapter to produce extrusions, and ice cream bars, with variously-shaped centers.

In the form of the invention shown in FIGURE 7–15, the die member is one integral element. No interfitting of engageable parts is required to produce this intergal die member. Also, in this embodiment, the flow surfaces are smooth so as to produce minimum turbulence of the frozen dessert or other fluid materials.

Referring to FIGURES 1–4 of the drawings, the nozzle 10 is designed and constructed to receive three flavors of ice cream from the delivery pipes 12, 14 and 16, respectively and form these flavors into a continuous extrusion or roll that is sliced by a pair of horizontally-reciprocating wires 18 and 20 into a series of slices or bars 22 that fall onto a series of moving pallets 24. The pallets 24 carry the ice cream bars to further processing zones where chilling, enrobing with chocolate, and wrapping can be accomplished.

As seen in FIGURES 2 and 4, the composite, multi-flavored bar 22 includes a raspberry sherbet center portion 26 in the shape of a heart, surrounded by two side portions 28 and 30. The side portion 28 is of vanilla flavors. To achieve an attractive variety of flavors in the composite bar 22, the side portion 30 is of chocolate flavor. Various combinations of flavors can be utilized in forming the composite bars. The two side portions 28 and 30 can be formed of the same flavor to surround the center portion 26 with a single flavor, as hereinafter described with respect to FIGURE 6.

The streams of vanilla and chocolate ice cream to form the side portions 28 and 30 are pumped downwardly through pipes 12 and 16, respectively, into the upper end of the interior of tapered portion 32 of a generally funnel-shaped nozzle housing or outer tube 34. The stream of raspberry sherbet to form the bar center 26 is pumped downwardly through pipe 14 into the interior of die member 35 including a right-circular-cylindrical body or tubular portion 36 of an adapter 38 having a die 40 releasably secured to the lower end thereof. The raspberry sherbet passes downwardly through the adapter body 36 and through the aperture 42 having the shape of a heart and formed in die 40.

In order uniformly to fill the cross-sectional areas of the housing 32 and the adapter body 36 with the streams of frozen dessert, the lower outlet end of each of the pipes 12, 14 and 16 is formed with two inwardly-curved deflecting plates 43 with a slot 44 formed between the deflecting plates. Each curved deflector plate 43 has an orifice 45 formed therein. The ends of the deflector plates 43 are curved to form opposed ports 46. The slots 44, the orifices 45 and the ports 46 cooperate to provide a distribution of the frozen dessert to fill out the cross-sectional area of the housing 32 and adapter body 36. This formation of the pipe ends can be accomplished as set forth in U.S. Patent 3,088,638 granted May 7, 1963.

As the streams of ice cream pass downwardly through the tapered housing portion 32, the diminishing cross-sectional area of the housing further causes the ice cream to be compacted to eliminate voids and to be pressed into the corners of the tapered housing portion 32 and to uniformly engage the inner surfaces of the sides of the housing 34. Thus, at the lower edge of die 40, when the heart-shaped sherbet stream is engaged by the chocolate and vanilla creams, the chocolate and vanilla streams uniformly engage the outer surface of the heart-shaped sherbet stream.

The multi-flavored, composite roll passes downwardly into rectangular housing skirt or outlet housing portion 47 and uniformly engages the corners and inner surfaces thereof. The slicing wires 18 and 20, synchronously horizontally reciprocated toward and away from each other by apparatus (not shown), successively slice the composite roll into bars 22 which are parallelepipedons having straight edges with the corners filled out and uniform and the sides of the bar having smooth surfaces.

The tapered housing portion 32 includes two opposite sharply-tapered end walls 48 and 49 and two opposite mild-tapered side walls 50 and 52. A flange is formed at the upper end of the tapered housing portion 32 and includes end flange portions 54 and 56 and side flange portions 58 and 60.

As seen in FIGURE 3, the side flange portions 58 and 60 have four holes 62 formed therein to accommodate bolts 64, seen in section in FIGURE 1, that secure the housing 10 to a base 66, seen in FIGURE 2, supporting the pipes 12, 14 and 16.

For the support of adapter 38, two grooves 68 and 70 are formed in the side flange portions 58 and 60. The grooves have a depth substantially equal to the thickness of adapter arms 72 and 73 extending outwardly from adapter body 36 and seated, as seen in FIGURE 1, in the grooves 68 and 70. It will be seen that the adapter 38 is rigidly supported or suspended by the engagement of arms 72 and 73 in the grooves 68 and 70. Further, the adapter 38 can be readily disengaged from the grooves to expose the surfaces of the arms and grooves for cleaning.

A pair of fins 74 and 75 extend outwardly from diametrically opposite portions of adapter body 36 to provide for separation of the vanilla ice cream stream from the cholotate ice cream stream. Fin 74 is connected to arm 72. Similarly, fin 75 is connected to arm 73.

The fins divide the space between the housing 32 and adapter body 36 into two sectors on opposite sides of the fins. Different flavors of frozen dessert can be supplied to these sectors.

To releasably secure the die 40 to the adapter 38, a pin 76, seen in FIGURE 2, extends from the inner surface of adapter body 36 and engages an L-shaped slot 78 formed on the diminished portion 80 of die 40. By inserting the diminished die portion 80 into the adapter body 36, with the pin 76 engaging the slot 78, and then rotating the die 40 with respect to the adapter body 36, so that the pin 76 enters the horizontal portion of the L-shaped slot 78, a releasable locking of the die 40 and adapter 38 is achieved.

The die 40 includes an enlarged lower portion 82 forming a shoulder 84 which abuts the lower edge of adapter body 36 when the parts are assembled, as seen in FIGURE 2.

The housing skirt 47 includes two side walls 86 and two end walls 88 joined at corners and forming a tube of rectangular cross-section that determines the external shape of the frozen dessert extrusion. The interiors of the tapered housing portion 32 and skirt 47 form a continuous bore extending through the nozzle housing 34.

Another form of die 90 is shown in FIGURE 5 and has a circular aperture 92 formed therein to produce, when assembled with the other elements of the nozzle, a composite ice cream bar having a circular center. Dies can be used having apertures with shapes of rabbits, turkeys, Santa Clause, et cetera. The nozzle housing 34 and adapter 38 can be formed of stainless steel, which is costly to machine. The dies 40 and 90 can be formed of readily-machinable plastic laminates.

Referring to FIGURE 6, another form of adapter 100 is shown having a cylindrical body 102 and arms 104 and 106 extending therefrom. This adapter differs from the adapter 36 in having no fins. The adapter 100 can be used for forming ice cream bars wherein the side portions 28 and 30 are of the same flavor.

In the embodiment of the invention illustrated in FIGURES 7–15, the die member 200 is a single integral element. In this embodiment, the outer housing or tube 34 has the same shape as in FIGURES 1–6. The parts of the outer housing 34 bear like reference numerals and will not be described again. Also, the delivery pipes 12, 14 and 16 are similar.

The die member 200 includes a cross-shaped top plate 202 comprising oppositely-extending arms 204 and 206 received releasably, as seen in FIGURE 13, in grooves formed in the flange portions 58 and 60. The top plate 202 also includes oppositely-extending flanges 208 and 210. The die member also includes a downwardly extending tubular portion or body 212 for shaping and guiding the frozen dessert material delivered from pipe 14 to form the core 214 of the ice cream bar 216 produced by the apparatus and shown in FIGURES 12, 14 and 15.

The tubular portion 212 has four panels 218, 220, 222 and 224 extending downwardly from top plate 202 and joined at their edges to form an aperture 230 extending through the die member. The aperture 230 extends through top plate 202 and the tubular portion 212 and has a substantially diamond-shaped cross-section. The aperture 230 has a tapering cross-section produced by the convergence of the panels 218, 220, 222 and 224 from the upper end at top plate 202 to the lower end. This convergence produces a compacting of the sherbet, ice cream, or other fluid materials supplied to the aperture 230 in the die member 200 and serves to force the sherbet into the corners 232 of the die aperture 230, as seen in FIGURE 13, firmly against the inner surfaces of the panels 218, 220, 222 and 224 to achieve, as seen in FIGURES 14 and 15, frozen dessert bars that have a diamond-shaped center or core 214 and have straight sides and a constant cross-sectional area.

For dividing the streams of enveloping ice cream to produce the straight line of division or interface 236, as seen in FIGURE 14, between the two enveloping flavors of chocolate 238, and vanilla 240, the die member 200 includes a pair of oppositely-disposed fins 242 and 244 having their outer edges 246 and 248 respectively, engageable with the inner surfaces of tapered side walls 50 and 52 of the housing portion 32.

The fin 242 is joined to the lower surface of arm 204 and to the intersection of panels 218 and 224. Similarly, the fin 244 is joined to the lower surface of arm 206 and to the intersection of panels 220 and 222. The fins 242 and 244 are shorter than the panels 218, 220, 222 and 224; the bottom edges 250 and 252 being located a distance above the bottom edges of the panels. The die member 200 can be formed from a single piece of stainless steel.

The fins 242 and 244 divide the space between the tubular portion 212 and housing 32 into two sectors 254 and 256, one for chocolate ice cream and the other for vanilla ice cream.

As seen in FIGURES 11 and 12, the lower end of tubular portion 212 is located in the outlet housing portion or skirt 47.

In forming multi-flavored ice cream bars with the apparatus shown in FIGURES 7 to 13, chococlate ice cream is delivered through pipe 12 to the sector 254 inside tapered housing portion 32. Vanilla ice cream is delivered through the pipe 16 to the sector 256. Orange sherbet is delivered through pipe 14 to the aperture 230 of the die member 200. The frozen desserts are pumped to flow downwardly. The chocolate and vanilla ice cream streams are compacted as they pass downwardly through tapered housing portion 32 into outlet housing portion or skirt 47. The orange sherbet is compacted as it passes downwardly through die aperture 230, by the narrowing cross-section produced by the convergence of the panels 218, 220, 222 and 224. The sherbet is formed into a column of diamond-shaped cross-section.

After the column of sherbet leaves the lower end of die member 200, it is engaged by the streams of chocolate and vanilla ice cream. The sides of the chocolate and vanilla ice cream columns are firmly pressed against the inner surfaces of the walls 86 and 88 of the outlet housing portion 47 to produce an extrusion, having filled out corners, substantially no voids, and flat sides. The reciprocating wires 18 and 20 slice the extrusion into a series of bars 216 that are carried away by movable pallets 224. Each bar 216 as seen in FIGURES 14 and 15, has straight smooth, planar sides and filled out corners.

Thus the invention provides an extrusion nozzle for forming multi-flavored frozen dessert bars with various center designs, that uniformly produces a series of bars having filled out corners, smooth, flat sides, and a minimum of voids. The extrusion nozzle is designed for convenient disassembly and cleaning and for reduced production costs.

While the present preferred embodiments of the invention have been illustrated and described, it will be recognized that the invention can be otherwise variously embodied and practiced within the scope of the following claims.

We claim:

1. A nozzle for extruding an extrusion of heterogeneous cross section comprising: a housing having an infeed end and an outlet end, said housing having a bore extending therethrough for forming material supplied to its infeed end into a shaped extrusion dischargeable from its outlet end, said housing including a tapered portion tapering from a larger cross-section at said infeed end to a smaller cross-section remote from said infeed end, said outlet end being provided by an outlet housing portion joined to the smaller end of said tapered portion, said outlet housing portion having a substantially uniform inner cross-section along its length for forming an extrusion of heterogeneous cross section with flat sides, said outlet housing portion being formed by walls with flat inner surfaces joined together at corners; a die assembly releasably mounted within the bore of said tapered housing portion, said die assembly having a central body portion with arms extending outwardly therefrom, said arms being releasably supported by said housing, said body portion having a cross sectional configuration corresponding to the cross section of the shape desired in the central portion of the extrusion.

2. The invention as set forth in claim 1 wherein said body portion has an aperture extending axially therethrough, said aperture shaped to taper from a larger cross-section at the end thereof adjacent said infeed end to a smaller cross-section remote from said infeed end, whereby said aperture diminishes in cross-section to compact material passing therethrough.

3. For use in extruding a composite frozen dessert bar, a nozzle comprising a housing having an infeed end and an outlet end, said housing having a bore extending therethrough for forming material supplied to its infeed end into a shaped extrusion dischargeable from its outlet end, said housing including a tapered portion tapering from a larger inner cross-section at said infeed end to a smaller inner cross-section remote from said infeed end, said outlet end being provided by an outlet housing portion joined to the smaller end of said tapered portion, said outlet housing portion having a substantially uniform inner cross-section along its length for forming a composite extrusion with flat sides, said outlet housing portion being formed by walls with flat inner surfaces joined together at corners; a die member releasably mounted within the bore of said housing, said die member including a tubular portion and two arms extending oppositely therefrom, said arms being releasably supported by said housing, said tubular portion having an aperture formed therethrough of a shape to form a desired core of the frozen dessert bar, said die member including two fins extending from opposed positions on said tubular portion, each said fin extending beneath an arm and engaging the inner surface of a tapered wall of said tapered housing portion for dividing the bore of said tapered housing portion, outside of said die member, into two sectors to accommodate two flavors of frozen dessert; whereby when primary frozen dessert material is supplied to the bore of said die member to form a core of the composite bar and two flavors of secondary frozen dessert material are respectively supplied to the sectors of said tapered housing bore outside of said die member, the taper of said tapered housing portion forces said secondary frozen dessert material into said corners of said outlet housing portion, firmly against the walls of said outlet housing portion, and firmly around said primary frozen dessert material to form a composite frozen dessert extrusion with flat sides having the shape of the bore in said outlet housing portion.

4. A nozzle for extruding a composite extrusion comprising: a housing having an infeed end and an outlet end, said housing having a bore extending therethrough for forming material supplied to its infeed end into a shaped extrusion dischargeable from its outlet end, said housing including a tapered portion tapering from a larger inner cross-section at said infeed end to a smaller inner cross-section remote from said infeed end, said outlet end being provided by an outlet housing portion joined to the smaller end of said tapered portion, said outlet housing portion having a substantially uniform inner cross-section along its length for forming a composite extrusion with flat sides, said outlet housing portion being formed by walls with flat inner surfaces joined together at corners; an adapter releasably mounted within the bore of said tapered housing portion, said adapter having a body and arms extending from said body, said adapter arms being releasably supported by said housing, said adapter having a bore extending therethrough; a die secured to said adapter and positioned in the central portion of said housing bore; said die having an aperture formed therein for forming a core within the composite extrusion; whereby when primary core material is supplied to the bore of said adapter to form a core of the composite extrusion and secondary material is supplied to the bore of said tapered housing portion outside of said adapter, the taper of said tapered housing portion forces said secondary material into said corners of said outlet housing portion, firmly against the walls of said outlet housing portion, and firmly around said primary core material to form the composite extrusion with flat sides having the shape of the bore in said outlet housing portion.

5. Apparatus for extruding a composite extrusion comprising a nozzle including a housing having an infeed end and an outlet end, said housing having a bore extending therethrough for forming material supplied to its infeed end into a shaped extrusion dischargeable from its outlet end, said housing including a tapered portion tapering from a larger inner cross-section at said infeed end to a smaller inner cross-section remote from said infeed end, said outlet end being provided by an outlet housing portion joined to the smaller end of said tapered portion, said outlet housing portion having a substantially uniform inner cross-section along its length for forming a composite extrusion with flat sides, said outlet housing portion being formed by walls with flat inner surfaces joined together at corners; an adapter mounted within the bore of said tapered housing portion, said adapter having a bore extending therethrough; a die secured to said adapter and positioned in the central portion of said housing bore, said die having an aperture formed therein for forming a core within the composite extrusion; means for continuously supplying primary core material to the bore of said adapter to form a core of the composite extrusion; and means for continuously supplying secondary material to the bore of said tapered housing portion outside of the said adapter; whereby the taper of said tapered housing portion forces said secondary material into said corners of said outlet housing portion, firmly against the walls of said outlet housing portion and firmly around said primary core material to form the composite extrusion with flat sides having the shape of the bore of said outlet housing portion.

6. A nozzle for extruding a composite extrusion comprising: a housing having an infeed end and an outlet end, said housing having a bore extending therethrough for forming material supplied to its infeed end into a shaped extrusion dischargeable from its outlet end, said housing including a tapered portion tapering from a larger inner cross-section at said infeed end to a smaller inner cross-section remote from said infeed end, said outlet end being provided by an outlet housing portion joined to the smaller end of said tapered portion, said outlet housing portion being formed by walls with flat inner surfaces joined together at corners, said housing having a pair of grooves formed at opposite locations in its upper surface; an adapter releasably positioned within the bore of said tapered housing portion, said adapter having arms resting in said grooves, said adapter having a pair of fins extending beneath said arms; a die secured to said adapter, said die having an aperture formed therein for forming a core within the composite extrusion; whereby when primary core material is supplied to the bore of said adapter to form a core of the extrusion and secondary material is supplied to the bore of said tapered housing portion outside of said adapter, the taper of said tapered housing portion forces said secondary material into said corners of said outlet housing portion, firmly against the walls of said outlet housing portion, and firmly around said primary core material to form the composite extrusion with flat sides having the shape of the bore in said outlet housing portion.

7. A nozzle for extruding a composite extrusion comprising: a housing having an infeed end and an outlet end, said housing having a bore extending therethrough for forming material supplied to its infeed end into a shaped extrusion dischargeable from its outlet end, said housing including a tapered portion tapering from a larger inner cross-section at said infeed end to a smaller inner cross-section remote from said infeed end, said outlet end being provided by an outlet housing portion joined to the smaller end of said tapered portion, said outlet housing portion having a substantially uniform inner cross-section along its length for forming a composite extrusion with flat sides, said outlet housing portion being formed by walls with flat inner surfaces joined together at corners; an adapter releasably mounted within the bore of said tapered housing portion, said adapter having a body and arms extending from said body, said arms being releasably supported by said housing, said adapter having a bore extending therethrough, said housing and adapter being formed of stainless steel; a die releasably secured to said adapter and positioned in the central portion of said housing bore, said die having an aperture formed therein for forming a core within the composite extrusion, said die being formed of a readily-machinable plastic material; whereby when primary core material is supplied to the bore of said adapter to form a core of the composite extrusion and secondary material is supplied to the bore of said tapered housing portion outside of said adapter, the taper of said tapered housing portion forces said secondary material into said corners of said outlet housing portion, firmly against the walls of said outlet housing portion and firmly around said primary core material to form the composite extrusion with flat sides having the shape of the bore in said outlet housing portion.

8. Apparatus for extruding a composite extrusion comprising a nozzle including a housing having an infeed end and an outlet end, said housing having a bore extending therethrough for forming material supplied to its infeed end into a shaped extrusion dischargeable from its outlet end, said housing including a tapered upper portion tapering from a larger inner cross-section at its lower end, said housing including four walls joined at corners of the tapered housing portion and converging together toward the lower end thereof, a housing skirt joined to the lower end of said tapered housing portion, said housing skirt being formed of four walls joined perpendicularly at corners, said four skirt walls including two pairs of parallel walls, cross-sections of said housing skirt being rectangles, said housing having a pair of grooves formed at opposite locations at its upper end; an adapter mounted within the bore of said tapered housing portion, said adapter including a cylindrical body, said adapter having a pair of arms extending from said body, said arms resting in said grooves, said adapter having a pair of fins extending from opposite sides of said body and beneath said arms and for a substantial distance along the length of said housing, said fins being shaped to engage the tapered walls of said tapered housing portion to divide the bore thereof into two half portions surrounding said adapter, said adapter having a bore extending therethrough; a die releasably secured to said adapter and positioned in the central portion of said housing bore, said die having an aperture formed therein for forming a core within the composite extrusion, the lower end of said die being spaced a substantial distance above the lower end of said housing skirt; and three pipes for delivering material to said bore of said tapered housing portion on opposite sides of said adapter and into the bore of said adapter; whereby when primary core material is delivered through one said pipe to the bore of said adapter and secondary and tertiary materials are delivered through the other pipes to said bore of said tapered housing portion on opposite sides of said adapter, the convergence of the walls of said tapered housing portion forces said secondary and tertiary material into the corners of said housing skirt, firmly against the walls of said housing skirt, and firmly around said primary core material to form the composite extrusion with flat sides and a rectangular shape.

9. A nozzle for extruding three-flavored frozen dessert bars comprising: a housing having a tapered upper portion and a skirt extending downwardly from the lower edge of said tapered portion, said tapered portion having a tapered hollow interior of rectangular cross-section tapering from a large top cross-sectional area to a smaller bottom cross-sectional area, said tapered hollow interior communicating with the hollow rectangular interior of said skirt portion, said skirt having an open lower end for the discharge of a continuous multi-flavored extrusion of frozen dessert; said tapered housing portion having a pair of grooves formed in the middle of opposite sides of its upper surface; an adapter suspended in the middle of said tapered hollow interior of said tapered housing portion and including a right circular cylindrical body and a pair of arms extending from diametrally opposed portions of said body, each said arm having its end remote from said body resting in one of said grooves, said body having a pin extending inwardly from its inner surface; a frozen dessert die releasably secured to the lower portion of said adapter by an L-shaped slot formed in its side and engaging said pin, said die having a shoulder abutting the lower edge of said adapter body, said die having an aperture extending therethrough having a predetermined and preselected shape and communicating both with the hollow interior of said adapter body and with the hollow interior of said housing below said die.

10. The apparatus set forth in claim 9 in combination with means for delivering one flavor of frozen dessert to the interior of said adapter; and means for delivering different flavors of frozen dessert to the interior of said housing on opposite sides of said adapter.

11. A nozzle as described in claim 1, wherein the upper end of said housing has outwardly extending flanges with grooves formed in the top surface thereof within which the extremities of said arms supportingly rest for releasably supporting said die assembly.

12. A nozzle for extruding a composite extrusion comprising a housing having an infeed end and an outlet end, said housing having a bore extending therethrough for forming material supplied to its infeed end into a shaped extrusion dischargeable from its outlet end, said housing including a tapered portion tapering from a larger cross section at said infeed end to a smaller cross section remote from said infeed end, said outlet end being provided by an outlet housing portion joined to the smaller end of said tapered portion, said outlet housing portion having a substantially uniform inner cross section along its length for forming a composite extrusion with flat sides, said outlet housing portion being formed by walls with flat inner surfaces joined together at corners, a die member releasably mounted within the bore of said tapered housing, said die member having a central body portion with arms extending outwardly therefrom, said arms being releasably supported by said housing, said body portion having an aperture formed longitudinally therethrough with a cross sectional shape for forming a core of the desired shape within the composite extrusion; where by when primary core material is supplied to the aperture of said body portion to form a core of the composite extrusion and secondary material is supplied to the bore of said tapered housing portion outside of said die member, the tapered housing portion forces said secondary material into said corners of said outlet housing portion, firmly against the walls of said outlet housing portion, and firmly around said primary core material to form the composite extrusion with flat sides having the shape of the bore in said outlet housing portion.

13. Apparatus for extruding a composite extrusion comprising a nozzle including a housing having an infeed end and an outlet end, said housing having a bore extending therethrough for forming material supplied to its infeed end into a shaped extrusion dischargeable from its outlet end, said housing including a tapered portion tapering from a larger inner cross section at said infeed end to a smaller inner cross section remote from said infeed end, said outlet end being provided by an outlet housing portion joined to the smaller end of said tapered portion, said outlet housing portion having a substantially uniform inner cross section along its length for forming a composite extrusion with flat sides, said outlet housing portion being formed by walls with flat inner surfaces joined together at corners; a die assembly releasably mounted within the bore of said tapered housing portion, said die assembly having a central body portion, said body portion having an aperture formed therethrough with a cross sectional shape for forming a core of the desired shape within the composite extrusion; means for continuously supplying primary core material to the aperture of said body portion to form a core of the composite extrusion; and means for continuously supplying secondary material to the bore of said tapered housing portion outside of the said body portion; whereby the taper of said tapered housing portion forces said secondary material into said corners of said outlet housing portion, firmly against the walls of said outlet housing portion and firmly around said primary core material to form the composite extrusion with flat sides having the shape of the bore of said outlet housing portion.

14. In a nozzle extruder assembly having means for supplying extrudable material into an open ended, vertical hollow outer housing having means for being suspended beneath said supply means and through which housing the extruded material flows to form an extrusion product, the improvement comprising a die member releasably positioned within said housing and having a body portion extending centrally of said housing, said body portion having a cross sectional configuration corresponding to that desired in the central portion of the extrusion product and having arms extending outwardly from its upper end, and said housing suspending means having means for releasably supporting the extremities of said arms to detachably support said die member within said housing.

15. The apparatus described in claim 14, wherein said means supporting said housing includes a flange having an upper flat surface and said means for releasably supporting said arms comprises grooves in said upper flat surface in which the extremities of said arms freely rest.

16. The apparatus described in claim 14 wherein said body portion is hollow with a bore extending lengthwise therethrough of a cross sectional shape to form a central core of material of the desired cross section shape in the interior of the extrusion product.

17. The apparatus described in claim 16 additionally comprising fins extending outwardly from said body portion below said arms lengthwise of said body portion, the outer edge of said fins being contiguous to the inner wall of said housing to divide the interior into separate segments.

References Cited by the Examiner

UNITED STATES PATENTS

| | | | |
|---|---|---|---|
| 729,933 | 6/03 | Heilman-Taylor | 107—1.4 |
| 1,649,308 | 11/27 | Hunter | 107—1.6 |
| 1,933,557 | 11/33 | Kalvin | 107—14.1 X |
| 2,207,616 | 7/40 | Howser | 107—54.4 |
| 2,271,767 | 2/42 | Hummel | 107—1.4 |
| 2,531,127 | 11/50 | Hershey et al. | 107—1.4 |
| 2,689,537 | 9/54 | Peyton | 107—54.4 |
| 2,927,542 | 3/60 | Moser | 107—1.6 |

ROBERT E. PULFREY, *Primary Examiner.*

CHARLES A. WILLMUTH, *Examiner.*